F. G. LILJENROTH.
MEANS FOR INFLUENCING THE VARIATIONS OF MAGNETIC FIELDS.
APPLICATION FILED FEB. 15, 1912.
1,100,895.
Patented June 23, 1914.
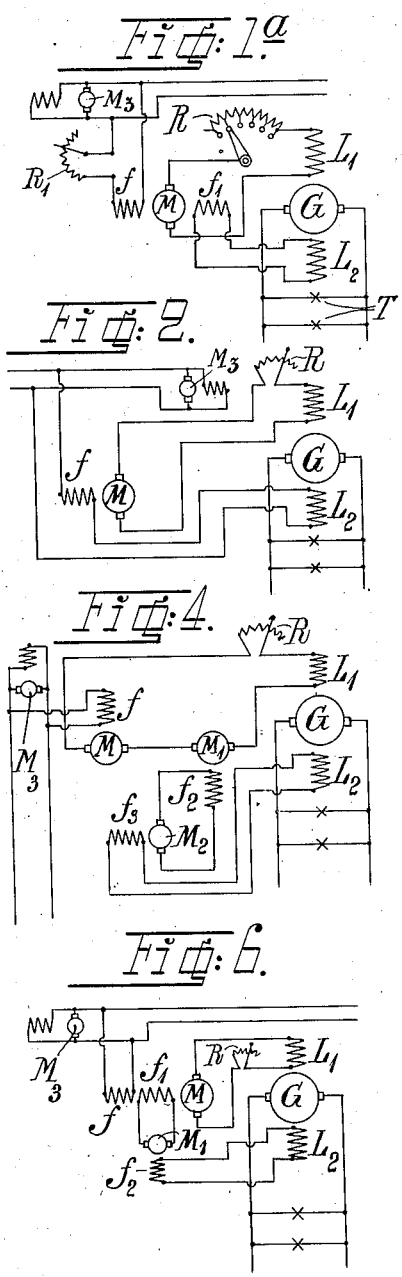
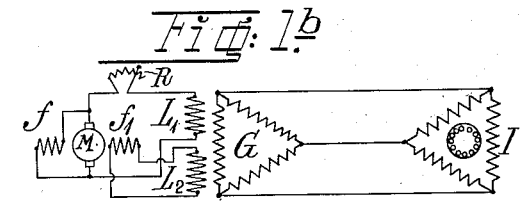
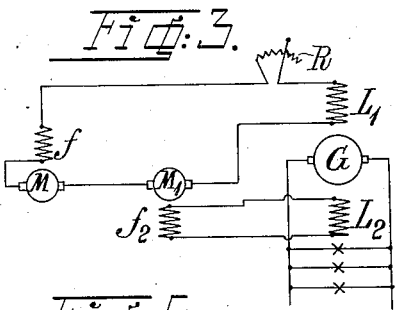
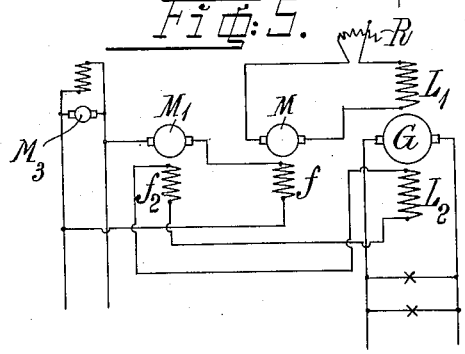
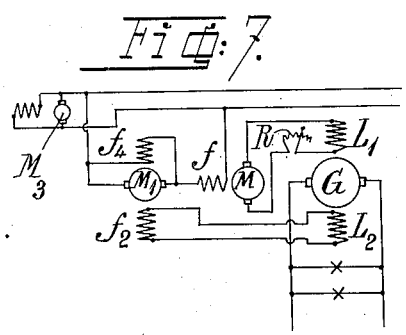
Witnesses:
E. Leckert
G. C. Tracy
Inventor.
Frans G. Liljenroth
By Henry O'Th... atty.

UNITED STATES PATENT OFFICE.

FRANS G. LILJENROTH, OF VESTERÅS, SWEDEN.

MEANS FOR INFLUENCING THE VARIATIONS OF MAGNETIC FIELDS.

1,100,895.  Specification of Letters Patent.  Patented June 23, 1914.

Application filed February 15, 1912. Serial No. 677,658.

*To all whom it may concern:*

Be it known that I, FRANS G. LILJENROTH, a citizen of the Kingdom of Sweden, residing at Vesterås, Sweden, have invented new and useful Improved Means for Influencing the Variations of Magnetic Fields, of which the following is a specification.

When the strength of a magnetic field is varied there arises, as is well known in an electric circuit inductively connected with the field, an electromotive force which is proportional to the variation of the field per unit of time and is so directed that it counteracts the variation of the field. On account thereof, a magnetic field requires, as is well known, a certain period of time to be created or to disappear or generally to be varied as to its strength. In electric machines, especially large alternating current generators and continuous current generators for supplying reversible motors according to the Ward-Leonard system said circumstance is connected with several inconveniences. In reversible continuous current motors for instance for driving rolling mills, it is desirable to effect speedy variations of the number of revolutions and speedy reversions, which requires that the voltage and accordingly the field strength of the continuous current generator should be varied almost instantaneously. On the other hand there results in large alternating current generators during short circuits, a momentary rush of current for the reason that the field does not disappear rapidly enough, and on the other hand a too long period of time is required to vary the field current, on account whereof, it is difficult to maintain a constant voltage when the load is varied.

The object of the arrangement described herebelow is generally to effect a more rapid variation of a magnetic field than that which is reached by means of the arrangements heretofore used. On account thereof it is possible in electric machines and apparatus to reach a more rapid regulation of the voltage than otherwise and a reduction of the rush of current in short circuits and connecting operations.

The invention consists chiefly in the provision in the magnetic field to be varied of a winding in which is induced a current which is dependent on the variation of the field per unit of time and which is used to deliver the excitation energy or a part thereof to one or more dynamo electric machines which are directly or indirectly connected to circuits in magnetic connection with the field to be varied.

In the accompanying drawings, I have shown some embodiments of my invention.

Figures 1$^a$, 1$^b$, and 2 to 7, show diagrammatically each one form of the invention.

Referring to Fig. 1$^a$, G represents the armature of a continuous current generator supplying translating devices T and having a main field winding $L_1$. The said main field winding $L_1$ is supplied with current from a continuous current machine M having an excitation winding $f$ supplied from a separate source of current $M_3$. A resistance R may be provided in the circuit of the winding $L_1$, or a resistance $R_1$ may be provided in the circuit of the winding $f$ for the purpose of regulating the voltage of the generator G by varying the strength of its field. $L_2$ indicates an auxiliary field winding disposed on the stationary magnetic core of the generator G in inductive relation to the magnetic field created by the main field winding $L_1$. The winding $L_2$ is connected to an auxiliary field winding $f_1$ of the continuous current machine M. As long as the magnetic flux of the field of the generator G remains constant, the auxiliary windings $L_2$ and $f_1$ are currentless. When, however, the said magnetic flux is subjected to variations, for instance on account of an adjusting of the regulating resistance R or on account of variations of the load on the circuit supplied from the generator G, an E. M. F. is induced in the windings $L_1$ and $L_2$, said E. M. F. being proportional to the variation of the magnetic flux per unit of time. The current proportional thereto generated in the circuit of the windings $L_2$ and $f_1$ causes a temporary variation of the magnetization of the exciter M which results in a variation (increase or decrease) of the voltage of said exciter, which practically likewise is proportional to the variation per unit of time of the magnetic field of the generator G. It may be assumed that the winding $f_1$ is so connected up in relation to the winding $L_2$ and the winding $f$ that the said variation of voltage between the terminals of the exciter M caused by the current supplied by the winding $L_2$ is directed oppositely to the voltage induced in the main field winding $L_1$ on account of the variation of the magnetic field of the generator G. The additional voltage momentarily supplied by the exciter, accordingly, tends to accelerate the variation of the field of the generator G. By suitable choice of the number of turns of the winding $L_2$ and the ratio of transformation of the continuous current machine M the said additional voltage of the exciter M and the voltage induced in the main field winding $L_1$ on account of the variation of the magnetic field of the generator G may be brought to nullify each other, which results in that the strength of the magnetic field of the generator G may be varied almost instantaneously from one value to another.

In Fig. $1^b$ I have shown a modification of the invention applied to a polyphase alternating current generator G supplying current to a polyphase induction motor I. $L_1$ is the main field winding of the generator G and $L_2$ an auxiliary field winding arranged substantially in the same manner as in Fig. $1^a$. The exciter M supplying the field winding $L_1$ has a field winding $f$ connected in shunt to its own armature. The auxiliary field winding $f_1$ of the exciter M is connected in series with the auxiliary field winding $L_2$. If, for instance, the load on the induction motor I is carried this generally results in a variation of the intensity as well as the lag of the current supplied from the generator G to the motor I, and this variation in its turn causes, on account of the armature reaction, a variation of the magnetic flux of the generator G. A momentary current is, accordingly, induced in the circuits of the windings $L_2$ and $f_1$ causing an additional excitation of the machine M which in its turn delivers an increased magnetizing current to the main field winding $L_1$ thereby accelerating the variation of the magnetic flux of the generator G.

The arrangement may also be carried out in such manner that the auxiliary winding $L_2$ of the generator G is connected in series with the field winding $f$ of the exciter M such an arrangement being shown in Fig. 2. The winding $f$ of the exciter M is as in Fig. $1^a$ supplied from a separate source of current $M_3$ but, if desired, it may be shunted to the terminals of the machine M as in Fig. $1^b$. This arrangement works substantially in the same manner as that shown in Fig. $1^a$.

In the form shown in Fig. 3 an auxiliary exciter $M_1$ is connected in series with the exciter M and the main field winding $L_1$ of the generator G. The field winding $f_2$ of the machine $M_1$ is connected in series with the auxiliary field winding $L_2$ of the generator G. When the magnetic flux of the generator G for some reason is varied, the winding $f_2$ consequently will receive a momentary exciting current which practically is proportional to the variation of the magnetic flux of the generator G per unit of time. On account thereof there is created between the terminals of the machine $M_1$ a voltage that will wholly or partly nullify the voltage induced in the winding $L_1$ on account of the variation of the said magnetic flux.

The form shown in Fig. 4 differs from that shown in Fig. 3 only in that the field winding $f_2$ of the machine $M_1$ is not connected directly to the auxiliary field winding $L_2$ of the generator G but to the terminals of a continuous current machine $M_2$ the field winding $f_3$ of which is connected to the auxiliary field winding $L_2$. This arrangement works substantially in the same manner as that shown in Fig. 3.

In the form shown in Fig. 5 a continuous current machine $M_1$ is connected in series with the field winding $f$ of the machine M and a separate source of current $M_3$ while in Fig. 6 it is arranged to supply current to an extra field winding $f_1$ of the exciter M. In both cases the field winding $f_2$ of the machine $M_1$ receives current from the auxiliary field winding $L_2$ of the generator G so that the machine $M_1$ becomes capable of exerting an accelerating action on the variations of the magnetic flux of the generator G by the influence which it exerts on the voltage of the machine M.

In order to increase the action of the auxiliary continuous current machine $M_1$, Fig. 5, respectively $M_2$, Fig. 4, one may provide said machine besides with the field winding $f_2$ respectively $f_3$ connected to the auxiliary field winding $L_2$ of the generator G with a second field winding, for instance connected in shunt to the terminals of the machine and having such a large resistance that the machine cannot excite itself unless the winding $L_2$ delivers a supplementary magnetizing current in the one direction or the other. Fig. 7, shows such a shunt connected field winding $f_4$ applied to an arrangement according to Fig. 5, but it may be understood that such a winding $f_4$ may be provided also in the machine $M_1$ in the forms shown in Figs. 3 and 6 or in the machine $M_2$, Fig. 4.

For the action aimed at of the above described arrangement it is necessary that the reaction of the auxiliary field winding $L_2$ on the field of the generator G be small, that the time-constants of the continuous current machines are small in relation to those of the main circuit, and that the continuous current machines are mechanically and electrically sufficiently powerful to transform the necessary excitation effect.

By having the current from the extra winding $L_2$ act in opposite direction to that supposed above, it is possible in all forms of the invention described above to retard the variations of the strength of the field of the generator G.

I claim:

1. In an electric apparatus, a main field winding for creating a magnetic field, an arrangement for influencing the variations of said magnetic field, consisting of an auxiliary winding disposed in inductive relation to said main field winding, and means for supplying to the said main field winding a magnetizing effect dependent on the current induced in the auxiliary winding, substantially as and for the purpose set forth.

2. In a dynamo-electric machine a main field winding adapted to be separately excited, an arrangement for accelerating the variations of the magnetic field of the machine, consisting of an auxiliary field winding disposed in inductive relation to said main field winding, and means for increasing the magnetizing effect supplied to the main field winding dependent on the current induced in the auxiliary winding, substantially as and for the purpose set forth.

3. In an electric apparatus, a main field winding for creating a magnetic field, an arrangement for influencing the variations of said magnetic field, consisting of an auxiliary field winding disposed in inductive relation to said main field winding, and a continuous current machine the armature of which is connected to said main field winding and adapted to supply a magnetizing effect to said main field winding dependent on the current induced in said auxiliary field winding, substantially as and for the purpose set forth.

4. In a dynamo-electric machine, a main field winding, an arrangement for accelerating the variations of the magnetic field of the machine, consisting of an auxiliary field winding disposed in inductive relation to said main field winding, and a continuous current machine the armature of which is connected to said main winding, and adapted to supply a magnetizing effect to said main field winding dependent on the current induced in said auxiliary field winding, substantially as and for the purpose set forth.

5. In a dynamo-electric machine, a main field winding, an arrangement for influencing the variations of the magnetic field of the machine, consisting of an auxiliary field winding disposed in inductive relation to said main field winding, a continuous current machine connected to said main winding and having a field winding supplied with a magnetizing current dependent on the current induced in said auxiliary winding on variations of the strength of the magnetic field of the dynamo-electric machine, substantially as and for the purpose set forth.

6. The combination with a dynamo-electric machine having a main field winding and an auxiliary field winding, of an exciter for supplying to said main field winding a magnetizing effect dependent on the current induced in said auxiliary field winding on variations of the magnetic flux of the dynamo-electric machine, substantially as and for the purpose set forth.

7. The combination with a dynamo-electric machine having a main field winding and an auxiliary field winding, of a continuous current machine having a field winding supplied with a magnetizing current dependent on the current induced in said auxiliary winding on variations of the magnetic flux of the dynamo electric machine and an armature connected in series with said main field winding, substantially as and for the purpose set forth.

8. The combination with a dynamo-electric machine having main field windings and auxiliary field windings, of an exciter the armature circuit of which is connected to said main field windings, and an auxiliary exciter having an armature connected to the field winding of the first mentioned exciter, and a field winding connected to said auxiliary windings, substantially as and for the purpose set forth.

In testimony that I claim the foregoing as my invention, I have signed my name in presence of two subscribing witnesses.

FRANS G. LILJENROTH.

Witnesses:
CONRAD DELMAR,
JOHN DELMAR.